United States Patent
Lin

(10) Patent No.: US 7,860,537 B2
(45) Date of Patent: Dec. 28, 2010

(54) DETECTING METHOD AND DEVICE FOR SAVING ELECTRICAL POWER CONSUMPTION OF COMMUNICATION DEVICE

(75) Inventor: Ying-Tsang Lin, Chiayi (TW)

(73) Assignee: Mitac International Corp., Taoyuan (TW)

( * ) Notice: Subject to any disclaimer, the term of this patent is extended or adjusted under 35 U.S.C. 154(b) by 589 days.

(21) Appl. No.: 11/926,240

(22) Filed: Oct. 29, 2007

(65) Prior Publication Data

US 2009/0111421 A1    Apr. 30, 2009

(51) Int. Cl.
*H04M 1/00* (2006.01)
*H04B 1/16* (2006.01)

(52) U.S. Cl. ................. 455/574; 455/343.1; 455/343.2

(58) Field of Classification Search ................. 455/574, 455/343.1, 343.2, 343.5, 572, 127.1, 127.5
See application file for complete search history.

(56) References Cited

U.S. PATENT DOCUMENTS

| | | | |
|---|---|---|---|
| 5,590,396 A * | 12/1996 | Henry ..................... | 455/426.1 |
| 6,990,362 B2 * | 1/2006 | Simpson et al. ............. | 455/574 |
| 7,313,419 B2 * | 12/2007 | Islam et al. ................. | 455/574 |
| 7,512,424 B2 * | 3/2009 | Hossain et al. ............. | 455/574 |
| 7,587,194 B2 * | 9/2009 | Kouchiyama et al. .... | 455/343.1 |

* cited by examiner

*Primary Examiner*—Sonny Trinh
(74) *Attorney, Agent, or Firm*—Workman Nydegger

(57) ABSTRACT

A detecting method and a detecting device for saving electrical power consumption of a communication device are introduced. During each operation cycle, a receiving end is switched between a hibernation mode and an operation mode alternately. The receiving end in the hibernation mode is supplied with a first electric power, the receiving end in the operation mode is supplied with a second electric power, and the first electric power is smaller than the second electric power. The receiving end in the operation mode detects whether there is a first signal from a sending end. If receiving the first signal, the receiving end is kept in the operation mode, and continued to be supplied with the second electric power. If the receiving end in the operation mode does not receive the first signal, the receiving end enters the hibernation mode and is supplied with the first electric power.

10 Claims, 5 Drawing Sheets

DETECTING METHOD AND DEVICE FOR SAVING ELECTRICAL POWER CONSUMPTION OF COMMUNICATION DEVICE

BACKGROUND OF THE INVENTION

1. Field of Invention

The present invention relates to a detecting method for saving electrical power consumption of a communication device, and more particularly, to a method of detecting the electrical power consumption of a standby receiving end of a radio walkie talkie.

2. Related Art

A radio walkie talkie utilizes a continuous tone-coded squelch system (CTCSS) to achieve multi-party communication. Another feature of the radio walkie talkie is direct point-to-point communication without setting any other auxiliary transmitting device. The two parties in the communication may start the point-to-point communication as long as they modulate the respective radio walkie talkie to the same frequency.

FIG. 1 is a block diagram of a radio circuit. The work flow of the radio walkie talkie is mainly divided into two parts, i.e., the receiving part and the sending part. The operation flow of the receiving part is (referring to the marks in the figure):

(1)→(2)→(3)→(4)→(5)

Firstly, in Step (1), when a signal appears, it is received by an antenna 111 and then sequentially passes through a low pass filter 112 and an antenna switch 113. In Step (2), the signal is amplified by a radio frequency amplifier 114 and then processed in a band pass filter 115. In Step (3), the signal is processed in a mixer 116, mainly for lowering a high frequency. Subsequently, the frequency of the signal is changed to an intermediate frequency, and then the signal is sent into an IF AMP 117 to be amplified. In Step (4), the signal is demodulated at the intermediate frequency. Finally, in Step (5), the processed signal is processed in an audio frequency amplifier 119, and then, the audio frequency amplifier 119 enables a speaker 120 to send sounds that can be heard by using a signal at about 1 KHz.

Compared with the receiving steps, the sending flow of the radio is:

(6)→(7)→(8)→(9)→(1).

In step (6), a microphone 130 receives an external audio signal. Generally speaking, the microphone 130 only has a voltage of several millivolts, so the signal must be amplified by a microphone amplifier 141. In Step (7), a phase lock loop (PLL) 142 is used to provide a high purity basic frequency signal to modulate an audio frequency. In addition, the PLL 142 also provides a local oscillation signal to the mixer 116 when receiving the signal. In Step (8), the signal is introduced into a TX AMP 143, so as to increase the transmitting power to be hundreds of microwatts. As such, in Step 9, a power module 144 is driven to transmit the signal through the antenna.

The radio walkie talkie has an operation method of simplex communication. The so-called simplex communication is that only one sending end is allowed to send an audio signal at the same time. It should be especially noted that, no matter whether the sending end sends a signal or not, the receiving end must be always in a receiving state. The long-time receiving action of the receiving end consumes a lot of power, and especially for outside users of radio, to save power is a quite important topic.

SUMMARY OF THE INVENTION

The object of the present invention is to provide a detecting method for saving electrical power consumption of a communication device, which is applied in a receiving end of a radio communication device, so as to save electrical power consumption when the receiving end is in a standby state. In each operation cycle, the receiving end is switched between a hibernation mode and an operation mode according to a first signal sent from a sending end.

In order to achieve the aforementioned object, in each operation cycle, the receiving end is switched between the hibernation mode and the operation mode alternately. The receiving end in the hibernation mode is supplied with a first electric power, the receiving end in the operation mode is supplied with a second electric power, and the first electric power is smaller than the second electric power. In the operation mode, the receiving end detects whether there is a first signal from another sending end. After receiving the first signal, the receiving end is kept in the operation mode and continued to be supplied with the second electric power. If the receiving end in the operation mode does not receive the first signal, the receiving end enters the hibernation mode and is supplied with the first electric power.

Another object of the present invention is to provide a communication device which is used in a radio communication system. The communication device includes a receiving end and a sending end. The receiving end is used to receive a first signal, and further includes a transmitting/receiving antenna, an audio modulation unit, a processing unit, and an electric power unit. The transmitting/receiving antenna is used to receive and transmit the first signal. The audio modulation unit is coupled to the transmitting/receiving antenna, so as to process the first signal. The processing unit is coupled to the audio modulation unit. The processing unit is coupled to the audio modulation unit, so as to be switched from the hibernation mode to the operation mode after a predetermined time cycle. When the processing unit is in the hibernation mode, the processing unit determines to supply a first electric power to the receiving end. When the processing unit is in the operation mode, the processing unit determines to supply a second electric power to the receiving end and detects whether the sending end sends the first signal in the operation mode. If the receiving end does not receive the first signal in the operation mode, the receiving end will be switched from the operation mode to the hibernation mode after a first time period. If the receiving end receives the first signal in the operation mode, the receiving end is kept in the operation mode.

The present invention provides a detecting method for saving electrical power consumption of a communication device, for detecting the communication state of a receiving end, so that the receiving end may consume less power.

A receiving end is provided, and the operation cycle of the receiving end includes a hibernation mode and an operation mode. After a first time period, the receiving end is switched from the hibernation mode to the operation mode, the receiving end in the hibernation mode is supplied with a first electric power, and the receiving end in the operation mode is supplied with a second electric power. Being switched to the operation mode, the receiving end detects a signal for communication sent from a sending end in a second time period. The receiving end is kept in the operation mode after receiving a plurality of first signals from the sending end. After the second time period, if the receiving end does not detect the first signal, the receiving end is switched from the operation mode to the hibernation mode.

In the present invention, the operation state of the receiving end of the communication device includes the hibernation mode and the operation mode, and the operation state of the receiving end is switched according to the fact whether a signal sent from the sending end is detected. In this manner, in the standby state of the receiving end, the electrical power consumption of the receiving end may be reduced, thereby prolonging the standby time of the receiving end.

The features and practice of the preferred embodiments of the present invention will be illustrated below in detail with reference to the drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

A receiving end must be always kept in the operation state in a communication period, which consumes a lot of electric power. Therefore, the present invention provides a method of detecting a state of radio communication, so that the receiving end may be kept in a receiving state, thereby consuming less electric power.

Figure 1:
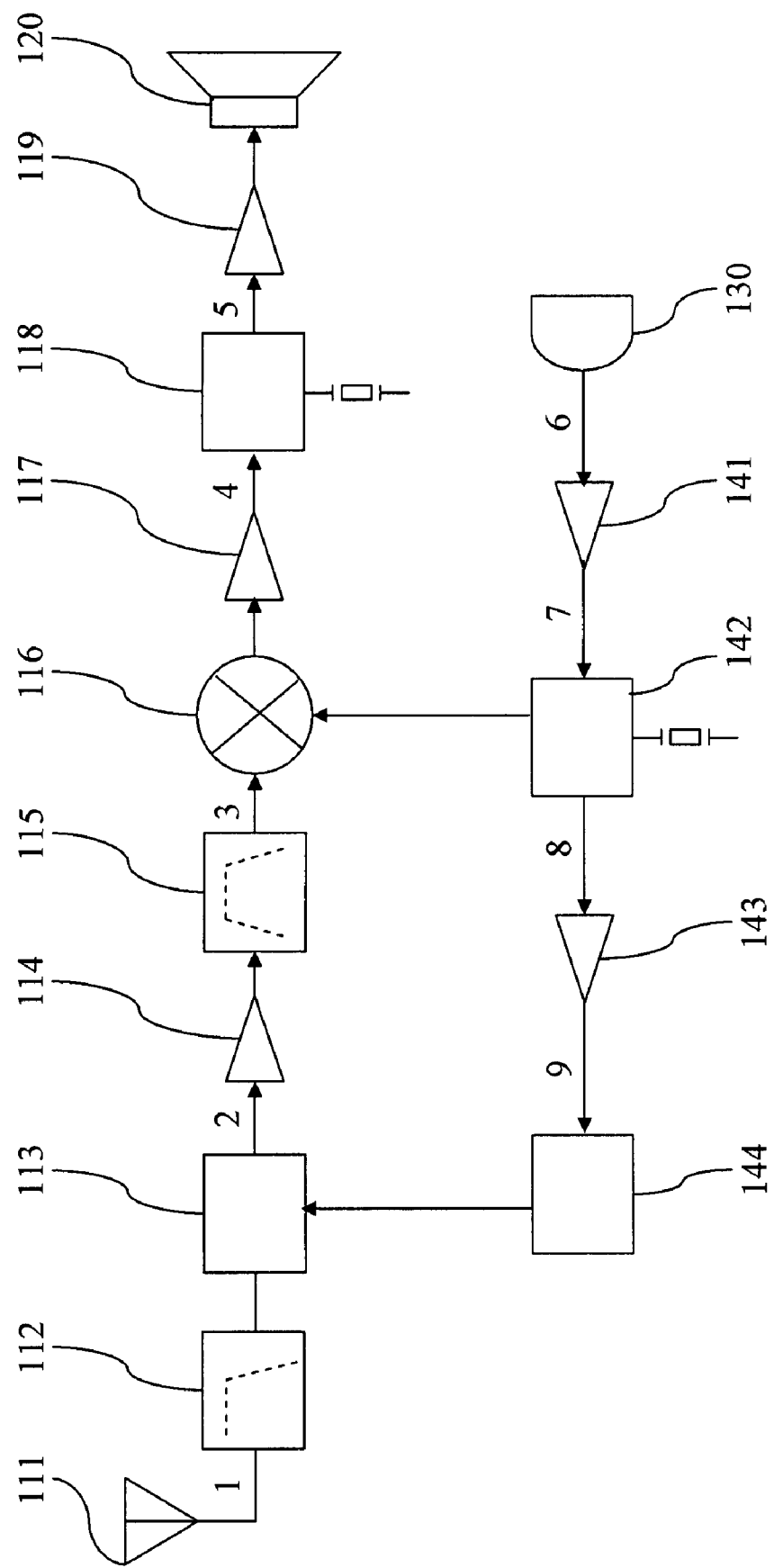
FIG. 1 is a schematic view of the linking of the Internet.
Figure 2:
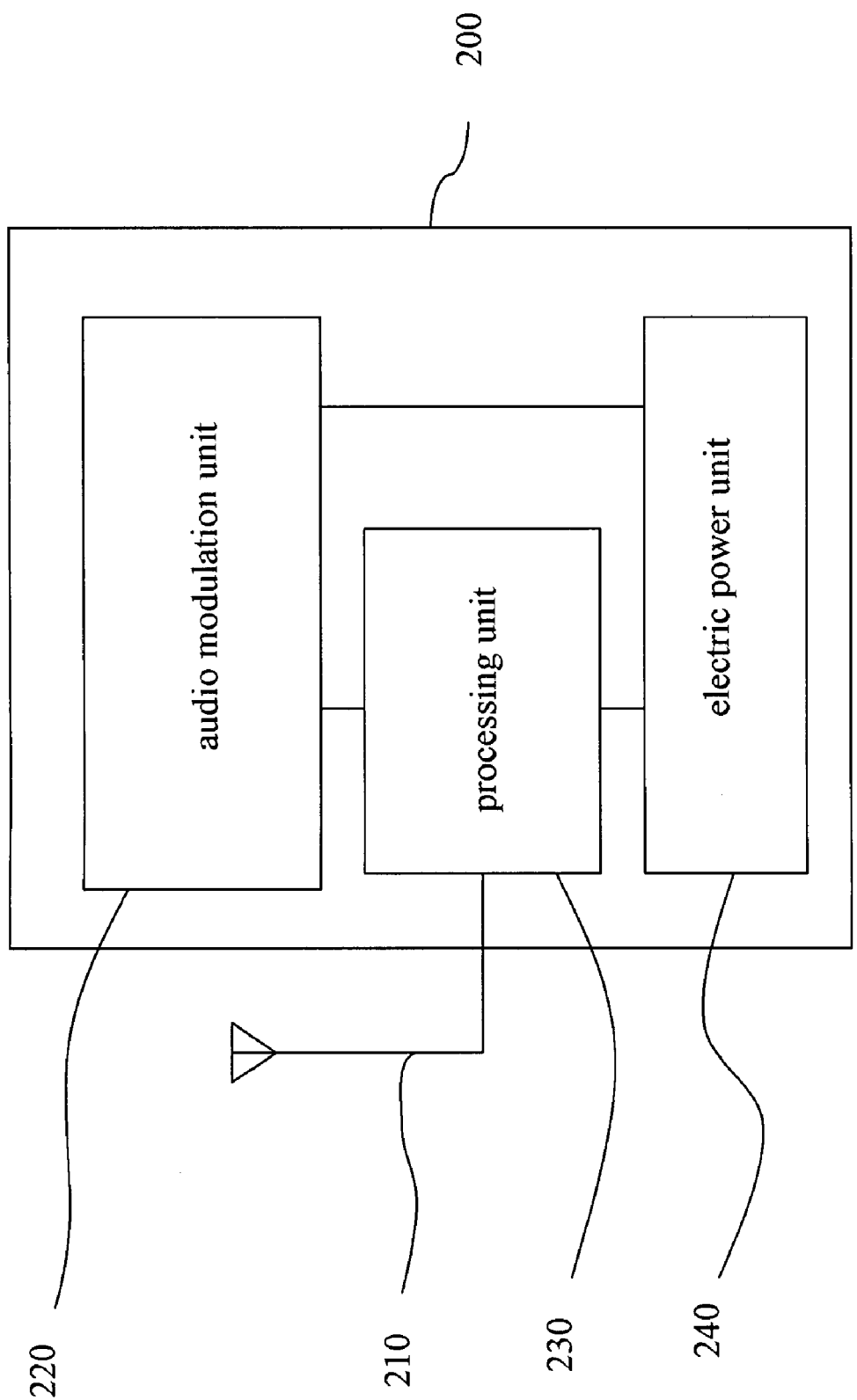
FIG. 2 is a block diagram of the architecture of the receiving end in the present invention.

FIG. 2 is a block diagram of the architecture of the receiving end in the present invention. The communication device provided by the present invention includes a sending end (not shown) and a receiving end 200. The sending end is used to send a first signal and a second signal. The receiving end 200 receives the first signal and the second signal, and the operation cycle of the receiving end includes a hibernation mode and an operation mode. The time required by the hibernation mode is a first time period, and the time required by the operation mode is a second time period. As for a radio communication device, the sending end and the receiving end 200 have the same structure, and herein, only the receiving end 200 is described.

In this embodiment, the first signal is a call setup message of the receiving end 200; and the second signal is an audio signal to be transmitted by the sending end. The receiving end 200 includes a transmitting/receiving antenna 210, an audio modulation unit 220, a processing unit 230, and an electric power unit 240. The transmitting/receiving antenna 210 is used to receive the signal sent by the sending end. The audio modulation unit 220 is coupled to the transmitting/receiving antenna 210, so as to process the audio signal. The processing unit 230 is coupled to the audio modulation unit 220.

The electric power unit 240 is coupled to the audio modulation unit 220 and the processing unit 230, and is used to provide electric power required by the operation of each unit. When the processing unit 230 is in the hibernation mode, the processing unit 230 determines to supply a first electric power to the receiving end 200. When the processing unit 230 is in the operation mode, the processing unit 230 determines to supply a second electric power to the receiving end 200 and detects whether the sending end sends a first signal in the operation mode. If the receiving end 200 does not receive the first signal in the operation mode, the receiving end 200 will be switched from the operation mode to the hibernation mode after the second time period. If receiving the first signal in the operation mode, the receiving end 200 is kept in the operation mode.

The second time period is determined by a sending time parameter period, a buffer time parameter buf, and a transmission time parameter τ, and the second time period is (period+buf+τ). The sending time parameter is determined by times of transmitting the first signals in the operation cycle. The transmission time parameter is determined by a time required by transmitting the first signals from the sending end to the receiving end 200 and then back to the sending end.

Figure 3:
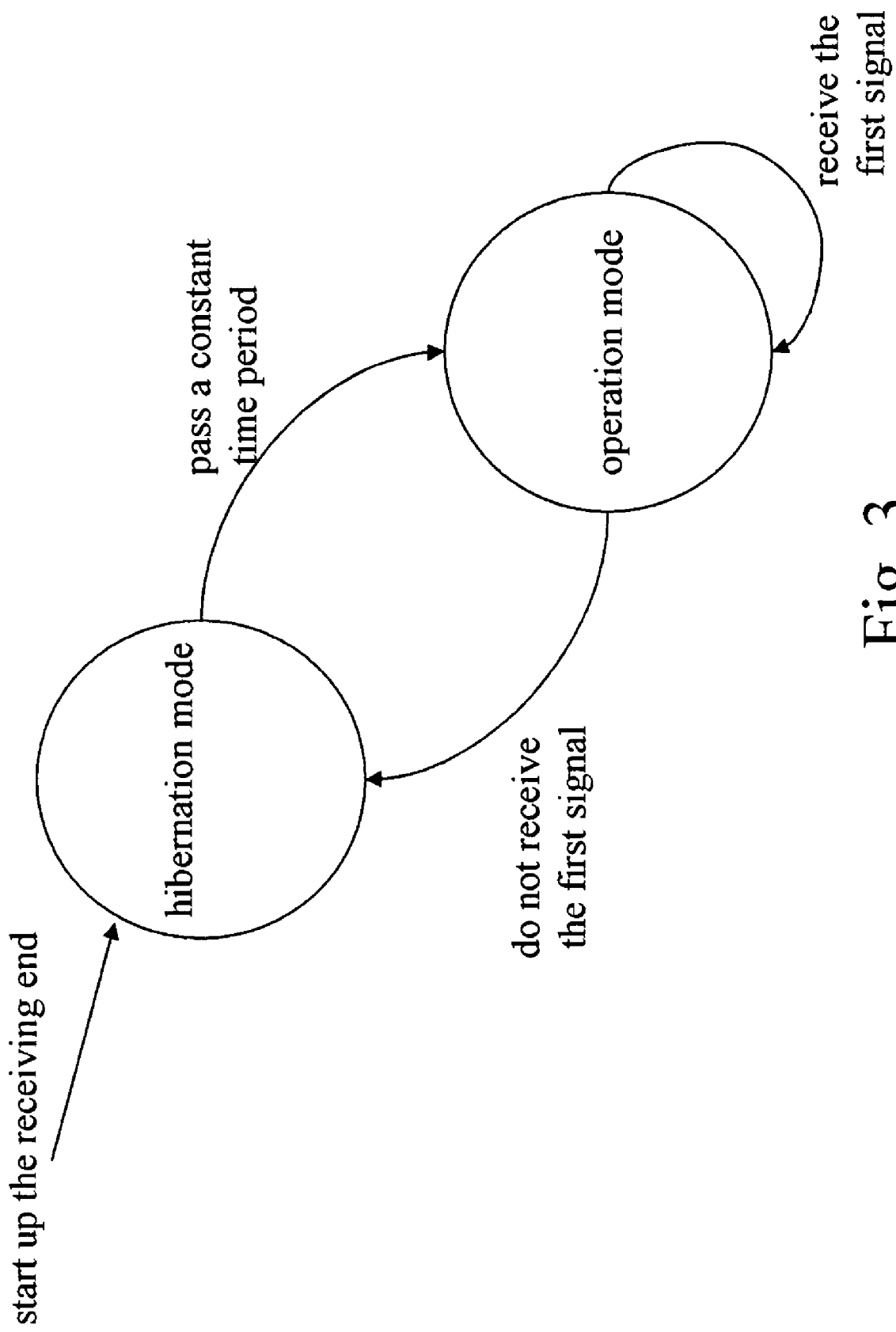
FIG. 3 is a schematic view of the state switching of the receiving end.
Figure 4:
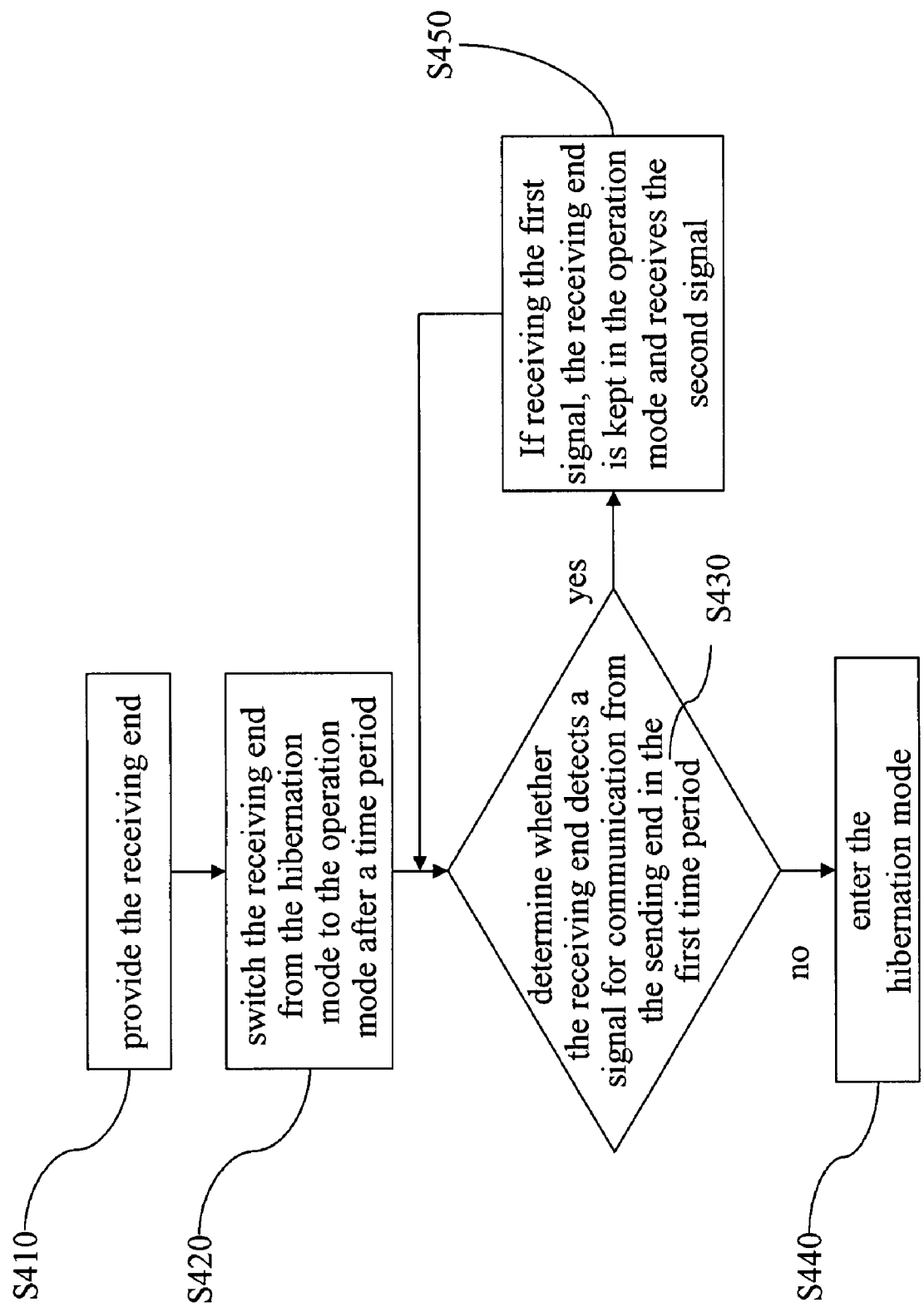
FIG. 4 is a flow chart of the operation of the receiving end.

FIG. 3 is a schematic view of the state switching of the receiving end. As shown in FIG. 3, the operation state of the receiving end 200 includes the hibernation mode and the operation mode. FIG. 4 is a flow chart of the operation of the receiving end. Referring to FIG. 3 and FIG. 4, the operation flow of the communication device is described.

Firstly, a receiving end is provided (Step S410), and the operation cycle of the receiving end 200 includes the hibernation mode and the operation mode. Then, after a time period, the receiving end is switched from the hibernation mode to the operation mode (Step S420), the receiving end in the hibernation mode is supplied with the first electric power, and the receiving end in the operation mode is supplied with the second electric power. The receiving end is switched to the operation mode, and detects whether a signal for communication is sent from the sending end (Step S430) in a second time period. If the receiving end does not detect the first signal after the second time period, the receiving end is switched from the operation mode to the hibernation mode (Step S440). If receiving the first signal, the receiving end is kept in the operation mode, and receives the second signal (Step S450), and the receiving end begins to receive the second signal. After the receiving end 200 receives the second signal, repeat Step S430.

Figure 5:
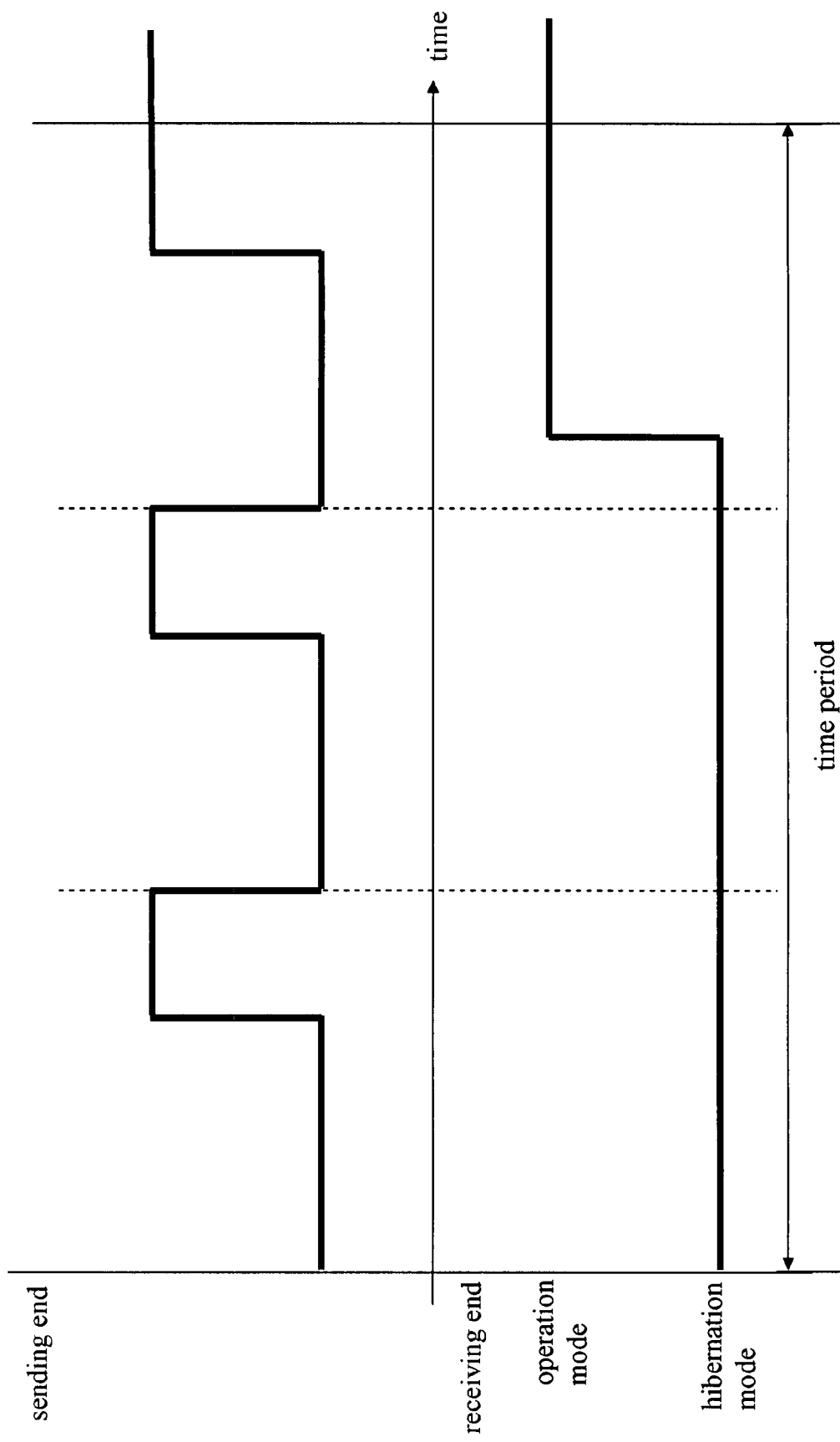
FIG. 5 is a schematic view of the transmission of the sending end and the receiving end of the present invention.

FIG. 5 is a schematic view of the transmission of the sending end and the receiving end of the present invention. FIGS. 4 and 5 may be referred for the clear illustration of the flow of switching the operation modes of the receiving end 200. In FIG. 5, the horizontal axis represents the time, and the upper portion and the lower portion of the longitudinal axis represent the operation states of the sending end and the receiving end 200, respectively. Herein, in order to illustrate the operation method of this embodiment more conveniently, it is assumed that the first signal has been transmitted in the operation cycle for "three" times, i.e., the sending end has sent the first signal for three times in the time period of each cycle. Therefore, the sending time parameter is "period/3." Firstly, the receiving end 200 is started up and enters the hibernation mode. Subsequently, the sending end has sent the first signal for three times in the first time period. When the sending end sends the first signal for the first time and the second time, the receiving end 200 fails to receive the first signal for it is in the hibernation mode and therefore, the receiving end 200 is still kept in the hibernation mode.

After the first time period, the receiving end 200 will be switched from the hibernation mode to the operation mode. At this point, the receiving end 200 is in the operation mode and then receives the first signal. Then, after the receiving end 200 receives the second signal, the receiving end 200 begins counting time, and detects whether the first signal is still sent in the second time period. If detecting the first signal, the receiving end 200 is in the hibernation mode.

The receiving end 200 in the present invention is switched from the operation mode to the hibernation mode alternately, so that the receiving end 200 may begin to receive the second signal as long as it may often receive the first signal in the operation mode, thereby efficiently reducing the electrical consumption and prolonging the standby time of the receiving end 200.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A detecting method for saving electrical power consumption of a communication device, comprising:
    providing a receiving end, wherein an operation cycle of the receiving end comprises a hibernation mode and an operation mode;
    after a first time period, switching the receiving end from the hibernation mode to the operation mode, wherein the receiving end in the hibernation mode is supplied with a first electric power, and the receiving end in the operation mode is supplied with a second electric power;
    switching to the operation mode, wherein the receiving end detects a signal for communication sent from a sending end in a second time period;
    keeping the receiving end in the operation mode when receiving a plurality of first signals from the sending end;
    switching the receiving end from the operation mode to the hibernation mode if the receiving end does not detect the first signals after the second time period; and
    wherein the second time period is determined by a sending time parameter period, a buffer time parameter buf, and a transmission time parameter τ, and the second time period is (period+buf+τ).

2. The detecting method for saving electrical power consumption of a communication device as claimed in claim 1, wherein the sending time parameter is determined by times of transmitting the first signals in the operation cycle.

3. The detecting method for saving electrical power consumption of a communication device as claimed in claim 1, wherein the buffer time parameter is determined by a transmission time span of a second signal from the sending end.

4. The detecting method for saving electrical power consumption of a communication device as claimed in claim 1, wherein the transmission time parameter is determined by a time required by transmitting the first signal from the sending end to the receiving end and then back to the sending end.

5. A communication device, applied in a radio communication system, comprising:
    a sending end, for providing a plurality of first signals; and
    a receiving end, for receiving the first signals, wherein an operation cycle of the receiving end comprises an operation mode and a hibernation mode, wherein the receiving end further comprises:
    a transmitting/receiving antenna;
    an audio modulation unit, coupled to the transmitting/receiving antenna, for processing the first signals;
    an electric power unit, for providing electric power required by the operation of the receiving end;
    a processing unit, coupled to the audio modulation unit, wherein the processing unit is used to count time for switching the receiving end from the hibernation mode to the operation mode after a first time period, when the processing unit is in the hibernation mode, the processing unit determines to supply a first electric power to the communication device, when the processing unit is in the operation mode, the processing unit determines to supply a second electric power to the communication device and detects whether the sending end sends the first signals in the period, if receiving the first signals in the period, the receiving end is kept in the operation mode, and if the receiving end does not receive the first signals in the period, the receiving end is switched from the operation mode to the hibernation mode after a second time period; and
    wherein the second time period is determined by a sending time parameter period, a buffer time parameter buf, and a transmission time parameter τ, and the second time period is (period+buf+τ).

6. The communication device as claimed in claim 5, wherein the electric power unit supplies corresponding electric power according to the hibernation mode and the operation mode.

7. The communication device as claimed in claim 5, wherein the sending end is further used to send second signals which are audio signals.

8. The communication device as claimed in claim 5, wherein the sending time parameter is determined by times of transmitting the first signals in the operation cycle.

9. The communication device as claimed in claim 5, wherein the buffer time parameter is determined by a transmission time span of a second signal from the sending end.

10. The communication device as claimed in claim 5, wherein the transmission time parameter is determined by a time required by transmitting the first signal from the sending end to the receiving end and then back to the sending end.

* * * * *